United States Patent
Hyatt

(10) Patent No.: US 12,456,184 B2
(45) Date of Patent: Oct. 28, 2025

(54) USE OF AN HDR IMAGE IN A VISUAL INSPECTION PROCESS

(71) Applicant: Siemens Aktiengesellschaft, Munich (DE)

(72) Inventor: Yonatan Hyatt, Tel-Aviv (IL)

(73) Assignee: Siemens Aktiengesellschaft, Munich (DE)

( * ) Notice: Subject to any disclaimer, the term of this patent is extended or adjusted under 35 U.S.C. 154(b) by 641 days.

(21) Appl. No.: 17/610,454

(22) PCT Filed: Jul. 30, 2020

(86) PCT No.: PCT/IL2020/050842
§ 371 (c)(1),
(2) Date: Nov. 11, 2021

(87) PCT Pub. No.: WO2021/024249
PCT Pub. Date: Feb. 11, 2021

(65) Prior Publication Data
US 2022/0318984 A1    Oct. 6, 2022

Related U.S. Application Data

(60) Provisional application No. 62/884,216, filed on Aug. 8, 2019.

(30) Foreign Application Priority Data

Aug. 8, 2019    (IL) .......................................... 268612

(51) Int. Cl.
*G06T 7/00*    (2017.01)
*G06T 5/50*    (2006.01)
(Continued)

(52) U.S. Cl.
CPC .............. *G06T 7/0004* (2013.01); *G06T 5/50* (2013.01); *G06T 5/92* (2024.01); *G06V 10/235* (2022.01);
(Continued)

(58) Field of Classification Search
CPC ..................... G06T 7/0004; G06T 5/50; G06T 2207/10144; G06T 2207/20208; G06T 2207/20212
See application file for complete search history.

(56) References Cited

U.S. PATENT DOCUMENTS

| 6,630,998 | B1 * | 10/2003 | Welchman | ........... | G01N 21/951 |
| | | | | | 382/141 |
| 7,239,805 | B2 | 7/2007 | Uyttendaele | | |

(Continued)

FOREIGN PATENT DOCUMENTS

| KR | 101688458 B1 | 12/2016 |
| WO | 2012/166044 | 12/2012 |
| WO | 2015/152821 | 10/2015 |

OTHER PUBLICATIONS

P. Ledda "Tone mapping for high dynamic range imaging", A thesis submitted to the university of Bristol UK, 2005 XP055225615, Retrieved from the Internet: URL:http://www.cs.bris.uk/publications/papers/2000256.pdf [retrieved on Nov. 3, 2015] *p. 48-51, section 3.1.2 photographs*.

(Continued)

*Primary Examiner* — Jennifer Mehmood
*Assistant Examiner* — Sebastian-Sy Vuchi Ngo
(74) *Attorney, Agent, or Firm* — Cozen O'Connor

(57) ABSTRACT

Embodiments of the invention provide a system and method for integrating HDR images in video processing in a time efficient process. In one embodiment, a method for machine vision image processing includes obtaining a plurality of
(Continued)

images of a scene, each image having a different exposure value. The images are captured by a camera having a specific dynamic range. Pixel values of the plurality of images are compared to the dynamic range of the camera to determine, based on the comparison, a minimal number of optimal images. This minimal number of optimal images is combined, to obtain an HDR image of the scene. The scene may include an object on an inspection line.

8 Claims, 8 Drawing Sheets

(51) Int. Cl.
  G06T 5/92     (2024.01)
  G06V 10/22    (2022.01)
  G06V 10/25    (2022.01)
(52) U.S. Cl.
  CPC .... *G06V 10/25* (2022.01); *G06T 2207/10144* (2013.01); *G06T 2207/20104* (2013.01); *G06T 2207/20208* (2013.01); *G06T 2207/20212* (2013.01); *G06T 2207/30168* (2013.01)

(56) References Cited

U.S. PATENT DOCUMENTS

| | | | |
|---|---|---|---|
| 9,224,070 | B1 | 12/2015 | Sundareswara |
| 9,729,824 | B2 | 8/2017 | Cutler et al. |
| 9,883,119 | B1 | 1/2018 | Atanassov et al. |
| 10,331,207 | B1* | 6/2019 | Simmons ............. H04N 13/383 |
| 10,924,687 | B2* | 2/2021 | Darson ................ H04N 25/771 |
| 11,653,081 | B2* | 5/2023 | Shimizu ............... H04N 23/684 348/229.1 |
| 2003/0182251 | A1 | 9/2003 | Kim |
| 2005/0243177 | A1 | 11/2005 | Kang |
| 2007/0253693 | A1* | 11/2007 | Hsu .......................... G03B 7/00 396/213 |
| 2008/0181533 | A1 | 7/2008 | Searete |
| 2009/0060315 | A1* | 3/2009 | Harris .................. G06T 7/0004 382/141 |
| 2010/0215246 | A1 | 8/2010 | Albeck |
| 2010/0259636 | A1 | 10/2010 | Tzur |
| 2012/0128230 | A1 | 5/2012 | Meada |
| 2012/0154607 | A1 | 6/2012 | Moed |
| 2012/0155741 | A1 | 6/2012 | Shibuya |
| 2012/0249844 | A1* | 10/2012 | Saito .................... H04N 23/741 348/222.1 |
| 2014/0294294 | A1* | 10/2014 | Tsuchiya ................... G06T 5/73 382/159 |
| 2015/0062382 | A1 | 3/2015 | Cote et al. |
| 2015/0064813 | A1 | 3/2015 | Ayotte |
| 2015/0109478 | A1* | 4/2015 | Levoy .................... H04N 23/73 348/231.6 |
| 2015/0131116 | A1 | 5/2015 | Sochi |
| 2015/0358646 | A1* | 12/2015 | Mertens .................. H04N 9/68 382/166 |
| 2016/0019681 | A1 | 1/2016 | Cheng |
| 2021/0243352 | A1* | 8/2021 | Mcelvain ............. H04N 25/583 |
| 2022/0101503 | A1* | 3/2022 | Ivanov ..................... G06T 5/50 |

OTHER PUBLICATIONS

Je-Kang Park, et al., "Machine Learning-Based Imaging System for Surface Defect Inspection", International Journal of Precision Engineering and Manufacturing-Green Technology, Jul. 2016, pp. 303-310, vol. 3, No. 3, Springer Nature, London, UK.

* cited by examiner

USE OF AN HDR IMAGE IN A VISUAL INSPECTION PROCESS

CROSS-REFERENCE TO RELATED APPLICATIONS

This is a U.S. national stage of application No. PCT/IL2020/050842 filed 30 Jul. 2020. Priority is claimed on U.S. Provisional Application No. 62/884,216 filed 8 Aug. 2019, and Israeli Application No. 268612 filed 8 Aug. 2019, the contents of which are incorporated herein by reference in their entirety, the content of which is incorporated herein by reference in its entirety.

FIELD

The present invention relates to visual inspection processes, for example, inspection of items on a production line.

BACKGROUND

Inspection during production processes helps control the quality of products by identifying defects and acting upon their detection, for example, by fixing them or discarding the defected part, and is thus useful in improving productivity, reducing defect rates, and reducing re-work and waste.

Automated visual inspection methods are used in production lines to identify visually detectable anomalies that may have a functional or esthetical impact on the integrity of a manufactured part. Existing visual inspection solutions for production lines, using cameras, rely on custom made automated visual inspection systems, which are typically highly expensive and require expert integration of hardware and software components, as well as expert maintenance of these in the life-time of the inspection solution and the production line.

When using automated visual inspection, image quality affects the ability of a processor running algorithms for inspection, to reliably carry out inspection tasks, such as, defect detection, quality assurance (QA), sorting and/or counting, gating, etc. For instance, imaged items of different colors, different reflective properties or different shapes may be facing a camera in a variety of angular directions and may often require different exposure settings (which are usually not within the camera's normal value range) to obtain a well exposed image.

High definition range (HDR) images may be used to improve image quality. In an HDR image the dynamic range of a digital camera is extended by exposure bracketing, namely, capturing several identical images of a scene, each with a different exposure value. The multiple frames are then combined together to create a single image that has a greater dynamic range than the camera can capture in a single shot.

However, exposure bracketing, which is typically enabled by changing exposure levels by adjusting the camera's shutter speed between the capture of each frame, includes a time gap in between the setting of each exposure level and the actual settling of the exposure value. Thus, in addition to the exposure time of each frame, this time gap makes the overall HDR image acquisition and processing time much longer than the acquisition and processing of a single image.

In automated visual inspection processes in plants, which typically cover vast quantities of inspected items, even a small time gap can translate to a slowed down inspection process.

Furthermore, automated visual inspection processes typically use video photography. However, to date, HDR video photography is available only in highly specialized and expensive cameras, such as professional movie cameras. Thus, using HDR images during automated visual inspection processes is currently not viable.

SUMMARY

Embodiments of the invention provide a system and method for integrating HDR images in video processing to enable obtaining high image quality in a time efficient process.

In one embodiment, a method for machine vision image processing includes obtaining a plurality of images of a scene, each image having a different exposure value. The images are captured by a camera having a specific dynamic range. Pixel values of the plurality of images are compared to the dynamic range of the camera to determine, based on the comparison, a minimal number of optimal images. This minimal number of optimal images is combined, to obtain an HDR image of the scene. The scene may include an object on an inspection line.

In one embodiment, the number of different exposure images and their respective exposure levels, required to obtain an HDR image, are pre-calculated, prior to the image processing process, e.g., prior to visual inspection of an item. Pre calculation of the number of images and exposure levels enables using a minimal number of images during exposure bracketing, eliminating the need to obtain many different exposure frames (in existing HDR creation this is typically a preconfigured number) to ensure complete exposure sampling within the dynamic-range.

In one embodiment, for example, in the case of imaging an object on an inspection line for purposes of defect detection and/or other inspection tasks, one image per object is determined to be at an exposure level which enables the highest level of information of the object. Thus, the optimal image per object is captured at a specific exposure level determined for the specific object. All processing pertaining to inspection tasks of the object in the image (e.g., the detection of the object, waiting for an image in which no movement is detected, detecting pixels belonging to the object, etc.), is done on this optimal image. Consequently, not all of the processing steps are performed on HDR images, saving time while waiting for the (time consuming) creation of an HDR image and only creating the HDR image when the object is ready to be inspected. Additionally, the optimal image is then used as part of the set of images used to obtain the HDR image, eliminating the time needed to acquire one of the set of different images used to obtain an HDR image.

Thus, embodiments of the invention run image processing steps and camera adjustment steps in parallel, as opposed to running them in succession, as typically done today, thereby reducing the time required for these processes.

BRIEF DESCRIPTION OF THE FIGURES

The invention will now be described in relation to certain examples and embodiments with reference to the following illustrative figures so that it may be more fully understood. In the drawings.

DETAILED DESCRIPTION

Figure 1:
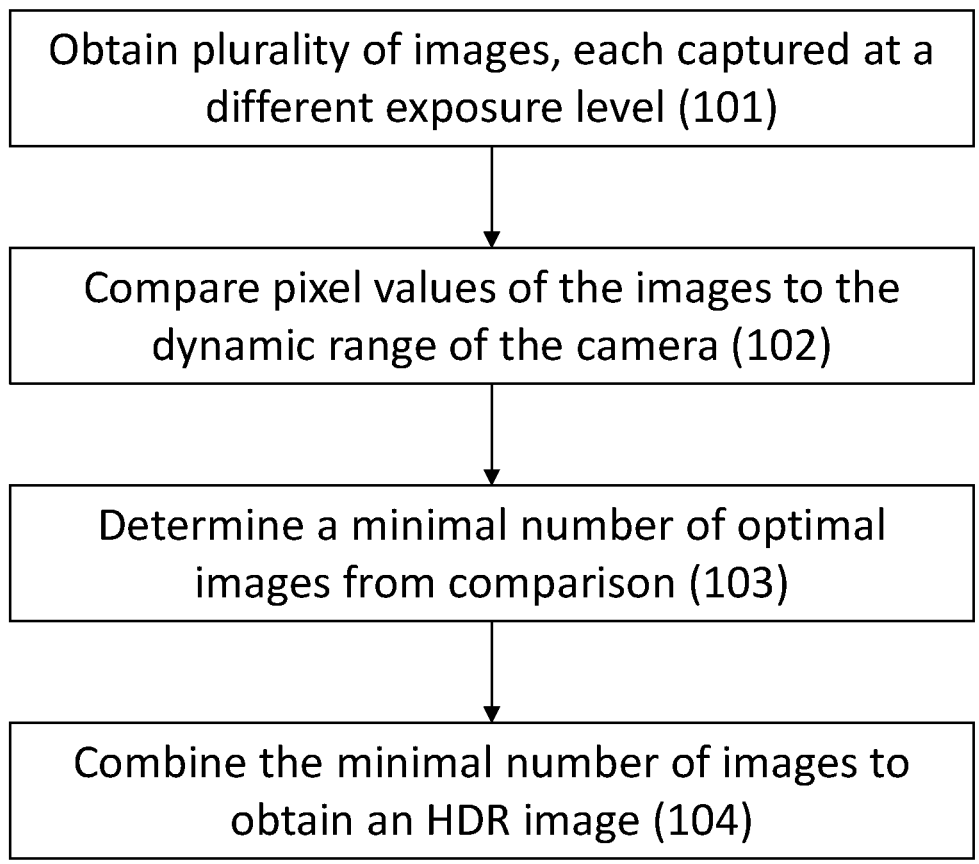
FIG. 1 schematically illustrates a method for obtaining an HDR image for machine vision image processing, according to an embodiment of the invention.

Typically, a visual inspection process uses images of items confirmed by a user, as a reference to which unconfirmed images of same-type items are compared, to detect defects on the item in the unconfirmed image or for other inspection tasks, such as QA, sorting, gating and more. The user confirmed images (also referred to as "reference images") are usually obtained during a setup stage prior to an inspection stage.

In one embodiment, in the setup stage, samples of a manufactured item with no defects (defect-free items) are imaged on an inspection line. The images (which may also be referred to as "setup images") are analyzed by a processor and are then used as reference images for image processing and defect detection algorithms run at the inspection stage.

In the inspection stage, inspected items (manufactured items that are to be analyzed for inspection tasks, e.g., defect detection, QA, sorting and/or counting, gating, etc.) are imaged and inspection tasks can be performed on the inspected items based on analysis of the setup images and inspection images.

In some embodiments, during the setup stage, a processor learns characteristics of an item, such as, spatial properties and uniquely representing features or attributes of an item in reference images, as well as optimal parameters of reference images, for example, optimal imaging parameters (e.g., exposure time, focus and illumination). These properties may be learned, for example, by analyzing images of an item (e.g., a defect-free item) using different imaging parameters and by analyzing the relation between different images of a same type of (possibly defect-free) item. This analysis during the setup stage enables to discriminatively detect a same type of item (either defect-free or with a defect) in a new image, regardless of the imaging environment of the new image, and enables to continually optimize the imaging parameters with minimal processing time during the following inspection stage.

In one embodiment, the analysis of the setup images is used to determine a spatial range in which the defect-free item shows no significant perspective distortion when aligned with another same type item. The level of perspective distortion between items in different images can be analyzed, for example, by detecting regions in an item which do not have corresponding features between the setup images, by analyzing the intersection location and angles between the item's borders or marked areas of interest on the item, etc. The borders of the spatial range may be calculated by comparing two (or more) setup images (in which items may be positioned and/or oriented differently) and determining which of the images show perspective distortion and which do not.

The calculated range can then be used to determine the borders of where and/or in which orientation, scale or other dispositioning, an inspected item may be placed on the inspection line so as to avoid distortion when compared with the reference images. Additionally, by using a set of setup images as references for each other, the processor can detect images having similar spatial decomposition and this set of images can then be analyzed to see if there are enough similar setup images to allow registration, defect-detection and other analyses for each possible positioning of the item on the inspection line.

"Enough setup images" are collected when an essentially complete representation of a type of item is achieved. For example, when enough images are collected to enable determining the spatial range in which each reference image can be used as a distortionless reference, as described above. Analysis of the setup images may be performed to collect characteristics of an item, information regarding possible 2D shapes and 3D characteristics (e.g., rotations on the inspection line) of an item or to find uniquely discriminative features of the item and the spatial relation between these unique features, as preserved between the setup images. Also, complete representation of a type of item is achieved when the range of shape tolerance characteristic to this item and the surface variations characteristic to this item are all manifested in the set of setup images.

Based on the information collected from setup images, a processor can detect a second item of the same type and perform inspection tasks, even if the second item was not previously learned by the processor. This allows the processor to detect when a new item (of the same type) is imaged, and then to analyze the new item, for example, to search for a defect on an inspected item, based on the analysis of setup images.

Although a particular example of a setup procedure or stage of a visual inspection process is described herein, it should be appreciated that embodiments of the invention may be practiced with other setup procedures of visual inspection processes.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "creating", "producing", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

The terms "item" and "object" may be used interchangeably and are meant to describe the same thing.

The term "same-type items" or "same-type objects" refers to items or objects which are of the same physical makeup and are similar to each other in shape and dimensions and possibly color and other physical features. Typically, items of a single production series, batch of same-type items or batch of items in the same stage in its production line, may be "same-type items". For example, if the inspected items are sanitary products, different sink bowls of the same batch are same-type items.

A defect may include, for example, a visible flaw on the surface of the item, an undesirable size of the item or part of the item, an undesirable shape or color of the item or part of the item, an undesirable number of parts of the item, a wrong or missing assembly of interfaces of the item, a broken or burned part, and an incorrect alignment of the item or parts of the item, a wrong or defected barcode, and in general, any difference between the defect-free sample and the inspected item, which would be evident from the images to a user, namely, a human inspector. In some embodiments a defect may include flaws which are visible only in enlarged or high resolution images, e.g., images obtained by microscopes or other specialized cameras.

One embodiment of the invention, which is schematically illustrated in FIG. 1, provides a new method for obtaining an HDR image which may be used in machine vision image processing, for example, in automated visual inspection processes.

A plurality of images of a scene are obtained (101) each image having a different exposure value. The camera used to capture these images has a dynamic range, which can be known, e.g., estimated roughly using typical values for the sensing equipment or preconfigured, for example, using lab calibration. Pixel values of the obtained images are compared to the dynamic range of the camera used to capture these images (102). A minimal number of optimal images can be determined based on the comparison (103). These optimal images are then combined to obtain an HDR image of the scene (104).

An optimal image may be determined based on a difference between values of pixels of the image to a middle value of the dynamic range. For example, in an optimal image, it would be desired that each pixel is as close to the middle of the dynamic range as possible and that no pixel is outside of the dynamic range. Thus, an optimal image may be an image having evenly distributed pixel values, an image with no over and/or under exposed areas (or with the least over and/or under exposed areas), etc.

For creating an HDR image using two (or more) images, a set of two (or more) optimal images may include images that together have pixels that are closest to the middle of the dynamic range and/or fulfill other conditions, as described above. For example, an HDR image can be created by taking from two (or more) images the pixel whose value is closer to the middle of the dynamic range of the camera.

The minimal number of images may be determined (in step 103) by using different optimization techniques and algorithms. In one example, a minimal number of images is calculated using a penalty score utilizing penalty factors which may be natural numbers (including zero). For example, a first penalty factor may be assigned to the number of images. A second penalty factor (which may be the same or different than the first penalty factor, typically of a number having a negative sign relative to the first penalty factor) may be assigned to each pixel not in the dynamic range, and a third penalty factor may be assigned to the difference between the value of the middle of the dynamic range to the value of the closest pixel to the middle of the dynamic range (also typically a number having a negative sign relative to the first penalty factor, and typically smaller than the second penalty factor). A minimal number of images may be determined by calculating the penalty score for all permutation groups of the images and/or by using optimization techniques and algorithms. Typically, the first penalty factor will attempt to impose a small as possible number of images (as a smaller number of different exposure images mean less time to create an HDR image), while the second and third penalty factors will attempt to impose an HDR image with higher contrast and more details.

In some embodiments, a penalty factor may be assigned to pixels based on entropy measurement of the HDR image created using the set of images. Higher entropy values mean the image has higher contrast and more details.

In other embodiments, a penalty factor may be assigned to pixels based on measurable information of the HDR image, e.g., the local contrast of the HDR image. The mean or median of the measurable information can be used to obtain a better HDR image. For example, higher mean or median of the measurement of local contrast across the HDR image means the image has higher contrast and more details. Any other information indicating measurements can be used instead or in addition to these.

In some embodiments, the scene includes a visual inspection line and the HDR image is used in different inspection tasks, such as defect detection, quality assurance (QA), gating, sorting and/or counting, etc.

Figure 2:
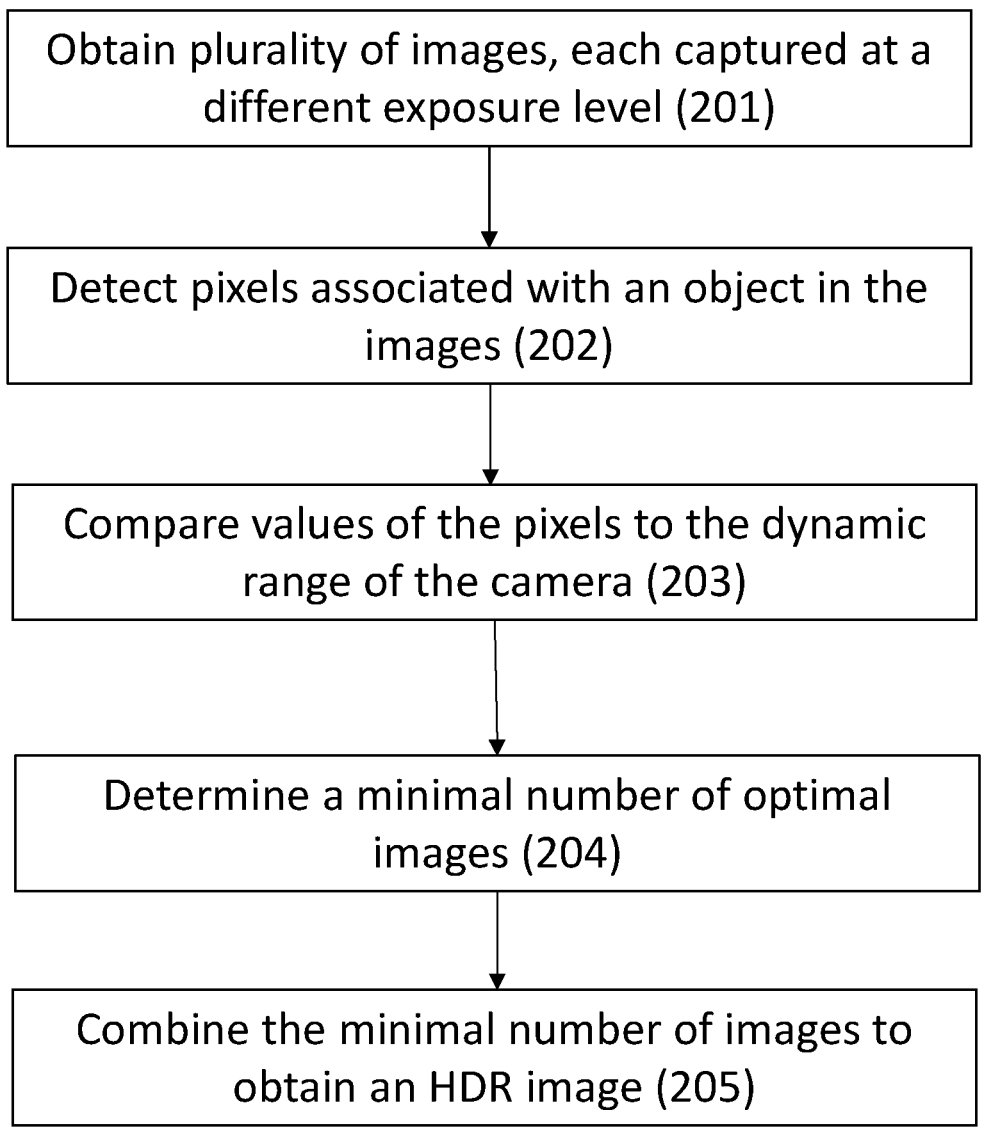
FIG. 2 schematically illustrates a method for obtaining an HDR image for machine vision image processing, according to another embodiment of the invention.

In one embodiment, an example of which is schematically illustrated in FIG. 2, an object is detected in the images of the scene and pixel values of pixels associated with the object, are compared to the dynamic range of the camera used to capture the images.

A plurality of images are obtained (201), each image captured at a different exposure level. Pixels associated with an object in the images are detected (202). The values of the pixels associated with the object are compared to the dynamic range of the camera used to capture the images (203). A minimal number of optimal images can be determined based on the comparison (204) and the minimal number of optimal images are then combined to obtain an HDR image of the object (205). The combined image may be displayed to a user and/or used for other inspection tasks. For example, the combined image may have defect detection algorithms applied to it to detect defects on the object.

The object may be an area of interest within the scene. For example, the object may be a region of interest on an inspected item. In some embodiments an area of interest may be automatically detected by a processor, e.g., by using image analysis techniques. Pixels associated with a detected object may be determined by using image analysis algorithms such as segmentation. In some embodiments, a processor receives indications of an outline (e.g., borders) of the object from a user and determines which pixels are associated with the object, possibly using segmentation and based on the borders of the object.

For example, based on user input of a region of interest (ROI) on an image of an item on an inspection line, a processor may create an outline or other indication surrounding the ROI. An outline of an object may be a shape, such as a polygon or circular shape, enclosing an imaged object close to the borders of the object. An indication of ROI, input by a user, may include coordinates and/or may include a line, e.g., a colored line, a broken line or other style of line, or polygon or other shape surrounding the region of interest.

The ROI may be an area on the object which is associated with defect detection. For example, an ROI may be an area on the object in which a user requires defect detection or an area on the object in which the user does not require defect detection. Additionally, same-type objects may have permitted differences, which are not defects. For example, objects may have texture, pattern or color differences or moving parts on the object surface, which are not considered to be defects. These areas of permitted differences may be defined as ROIs in which defect detection algorithms are not applied, thus avoiding false detection of defects.

Thus, specific, limited areas may be defined in an image, on which to run the HDR image creating algorithms described herein, instead of having the algorithm unnecessarily run on a full image.

The HDR image according to embodiments of the invention, can be used in an iterative process of analysis of a scene. In one example, the scene includes a visual inspection line and the process of analysis includes performing inspection tasks, such as, detecting a defect on an object on a visual inspection line.

Figure 3:
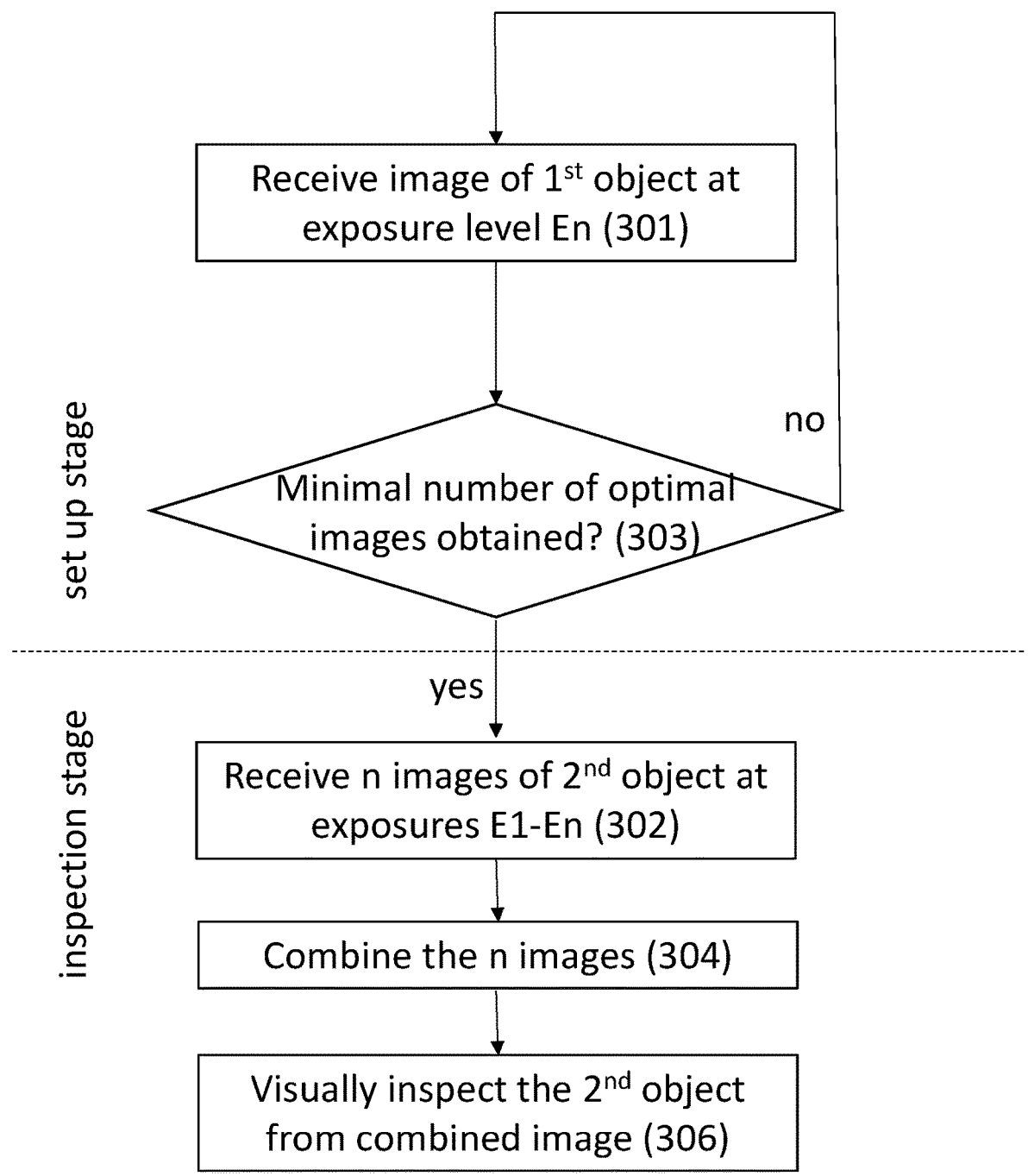
FIG. 3 schematically illustrates a method for an automated visual inspection process which includes a setup stage prior to an inspection stage, according to embodiments of the invention.

In one embodiment, which is schematically illustrated in FIG. 3, a method for an automated visual inspection process of an object includes a setup stage prior to an inspection stage in which the object is inspected. During the setup stage, an image of a first object is received at a processor (301). The image is captured at exposure level En, wherein "n" is a natural number increasable by units of 1, as further described herein.

The processor determines if a minimal number of optimal images has been obtained (303), e.g., by calculating a penalty score as described above and determining how the calculation results compare to a predetermined threshold.

If a minimal number of images has not been obtained (303), then another image of the first object is received, at another, different exposure level and a new combined image is created and analyzed.

If the minimal number of images has been obtained (303), then the number "n" is used as the number of images of a second same-type object that will be received in the following inspection stage. The n images of the second same-type object are captured at exposure values E1-En (302). These n images are combined (304) and the combined image is used for visual inspection of the second object (306).

Thus, for example, if two images of a first object, each captured at a different exposure level (E1 and E2), are determined to be the minimal number of images required to provide an optimal combined image, then n=2 and two images of a second same-type object will be captured one at exposure level E1 and the other at exposure level E2. These two images will be combined to create an HDR image for visual inspection of the second object. If two images of the first object are not enough to provide an optimal combined image (e.g., a penalty score calculated for these two images is below a threshold), a third image of the first object is captured, at exposure level E3. If these three images at exposure levels E1-E3 are determined to provide an optimal combined image then n=3 and three images of a second same-type object will be captured; one at exposure level E1, one at exposure level E2 and the third at exposure level E3. These three images will be combined to create an HDR image for visual inspection of the second object.

Thus, during the setup stage, a processor analyzing the reference images, determines a number of setup images of a first object on an inspection line, each image being captured at a different exposure value, such that, when combined, these images provide an optimal image, e.g., an image having optimally distributed pixel values and/or the image having the least over and/or under exposed areas. During the inspection stage, the same number of images of a second object of the same type are obtained, these images having the same different exposures as the images of the first object. The images of the second object are then combined to provide a combined image (e.g., an HDR image) for visual inspection of the second object. In some embodiments, the first object is a defect-free object and the second object is either defected or defect-free.

The term "visual inspection" may include displaying the image to a user, as further described herein. Visual inspection may also include applying a defect detection algorithm on the image to detect defects and/or applying other detection algorithms on the image to perform other inspection tasks, such as QA, sorting and/or counting, gating, etc.

In some embodiments, based on detection of the first object during the setup stage, the second object can be easily detected in the image, prior to, or in parallel to, obtaining n images of the second object. As described herein, detection of characteristics of a first object (from a first image or set of images) can be used to facilitate detection of a second, same-type object in a second image (or set of images). For example, spatial properties and uniquely representing features or attributes of the object may be detected in the first image of the object and may then be available when performing visual inspection of a same-type object in an HDR image, thereby saving time by avoiding the need to detect these features in the HDR image.

Thus, an object can be detected in an image by comparing the image of the object to a previous image of a same-type object, e.g., by comparing spatial parameters between the image of the object and the image of the same-type object. As described herein, detecting the object in an image in parallel to other video processing shortens the time gap between inspection images, facilitating the inspection process.

In some embodiments, an exposure level which enables the highest level of information of a scene or an object in the scene (e.g., an inspected object or an ROI in an image) is termed Eopt. An image captured at Eopt would typically have the most pixels within the dynamic range of the camera and/or will include the most pixels closest to the middle value of the dynamic range. In some embodiments, Eopt may be determined based on the entropy level of the image, e.g., by detecting the exposure level at which an object in an image has the highest entropy level. In other embodiments, Eopt may be determined based on the local contrast level in each image. Other methods may be used to determine an exposure level which enables the highest level of information of an image scene or part of the scene. Typically, the image obtained at Eopt will be the best single exposure image to be used for tasks preceding or succeeding the visual inspection task, such as object detection, alignment, movement estimation, etc., as this image has the highest level of details. Therefore, a minimal number of optimal images combined to obtain the HDR image, typically include the image captured at Eopt. Using the image captured at Eopt to create an HDR image, saves time (as further demonstrated in FIG. 7B).

For example, Eopt can be determined during a setup stage (as described above), by analyzing images of an item (e.g., a defect-free item) using different imaging parameters and by analyzing the relation between different images of a same type of item, typically a defect-free item. This analysis of images of an object at different exposures may be used to tune camera and/or illumination parameters and to tune the different exposure levels En.

Figure 4:
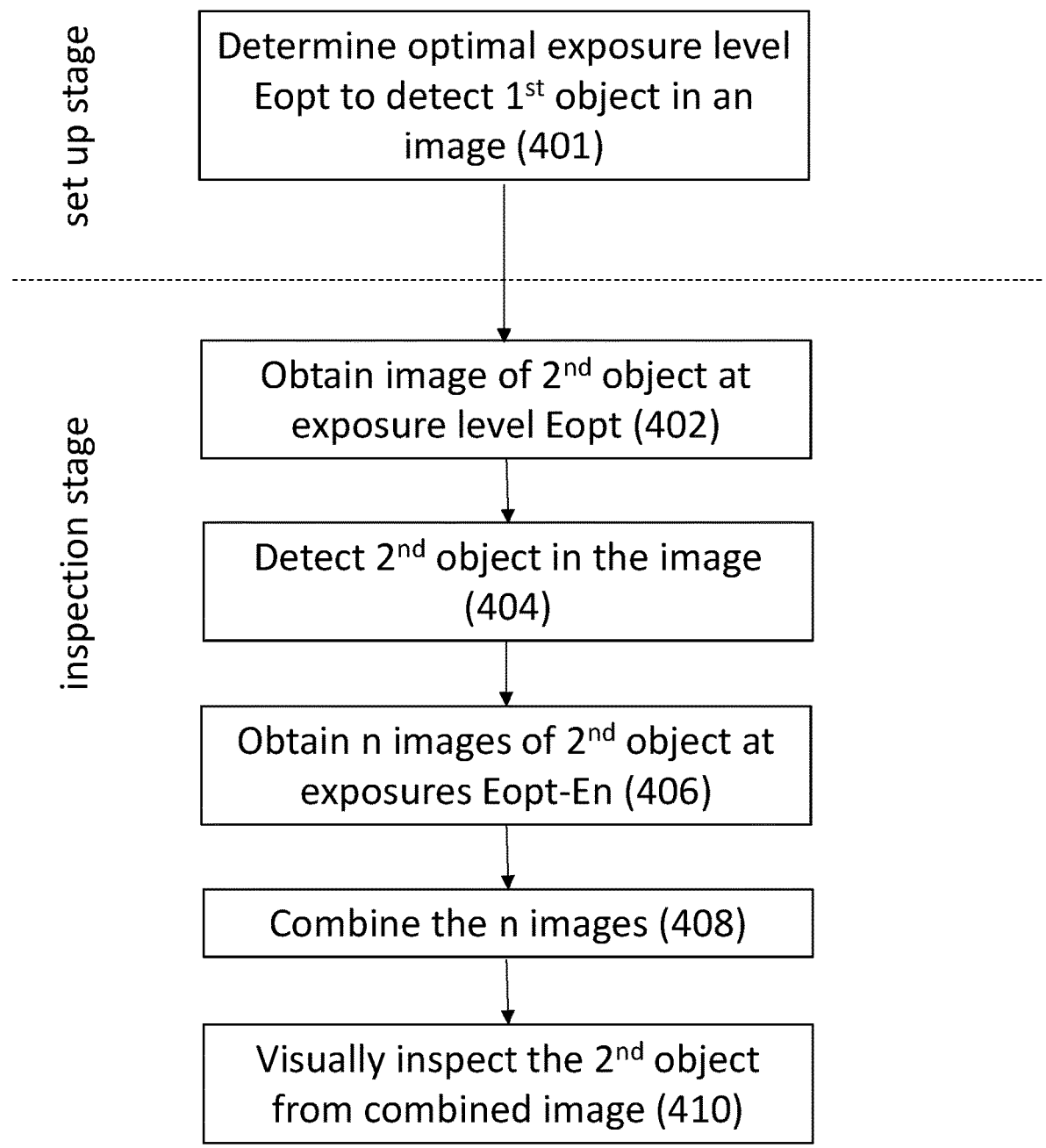
FIG. 4 schematically illustrates a method for an automated visual inspection process according to additional embodiments of the invention.

In one embodiment, an example of which is schematically illustrated in FIG. 4, a visual inspection method includes determining, in a setup stage (possibly from the analysis of the n images of the first object), an image having an exposure value (Eopt) that enables optimal detection of the first object in the image (401). An image of a second same-type item is then captured in the inspection stage at exposure Eopt (402) and the second object is detected in the image (404) at exposure Eopt. Additional n images of the second object are captured at exposure values E1-En (406). These n images are combined (408) and the combined image is used for visual inspection of the second object (410).

Typically, the image of the second object, captured at Eopt, is one the images combined to obtain a combined image for visual inspection of the second object. Using a previously captured image while creating an HDR image shortens the time required to obtain the HDR image (as further demonstrated in FIG. 7B), thereby facilitating an HDR based inspection process.

In some embodiments, a method for machine vision image processing includes obtaining a pre-calculated number of images of a scene, each image captured in a different predetermined exposure and analyzing the scene in the pre-calculated number of images to detect a predetermined object. A single HDR image, which is a combination of the number of images, is created and provided to a device (such as a user interface device and/or other device) for visual analysis of the object.

Figure 5:
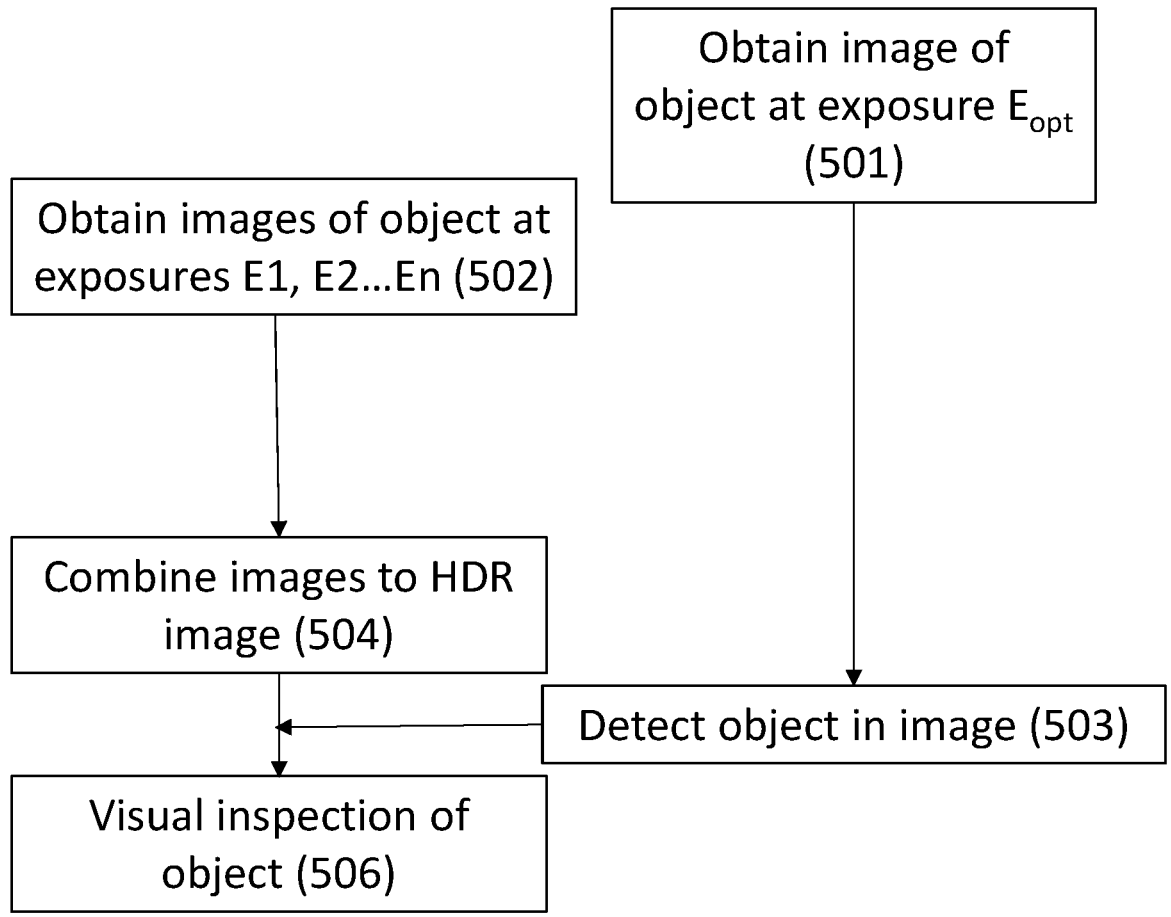
FIG. 5 schematically illustrates a method for an automated visual inspection process including parallel processing, according to additional embodiments of the invention.

FIG. 5 schematically illustrates a method for visual inspection of an object, according to some embodiments of the invention. An image of an object captured at Eopt is received at a processor (501). The object is then detected by the processor in the image (503) and parameters of the object (such as spatial parameters, discriminating features, borders of the object, etc.) are determined.

In parallel, a pre-calculated number of images of the object is obtained, each image captured at a different pre-determined exposure (502). The images are combined to provide a single HDR image (504). Input (such as parameters of the object) from the process of detecting the object in the Eopt image is used on the HDR image to assist visual inspection of the object in the HDR image (506).

The pre-calculated number of images is determined such that when combined, the images provide a single optimal HDR image.

FIGS. 6A, 6B, 7A and 7B schematically illustrate how methods according to embodiments of the invention provide time efficient video processing using HDR images.

Figure 6A:
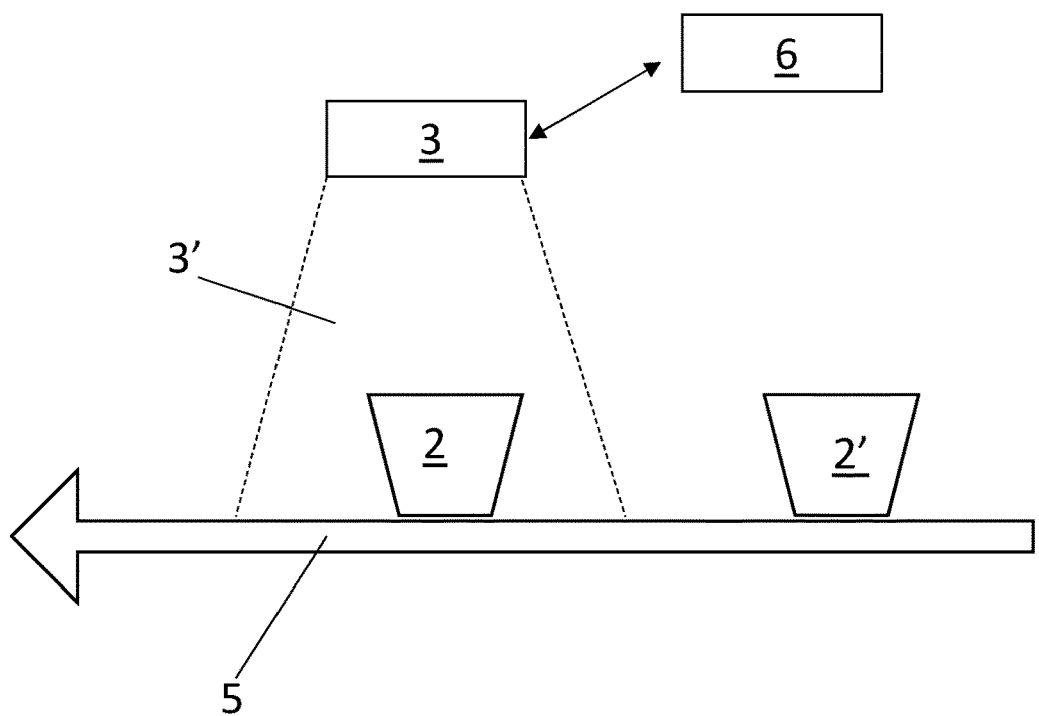
FIGS. 6A and 6B schematically illustrate a setup stage and an inspection stage according to embodiments of the invention.
Figure 6B:
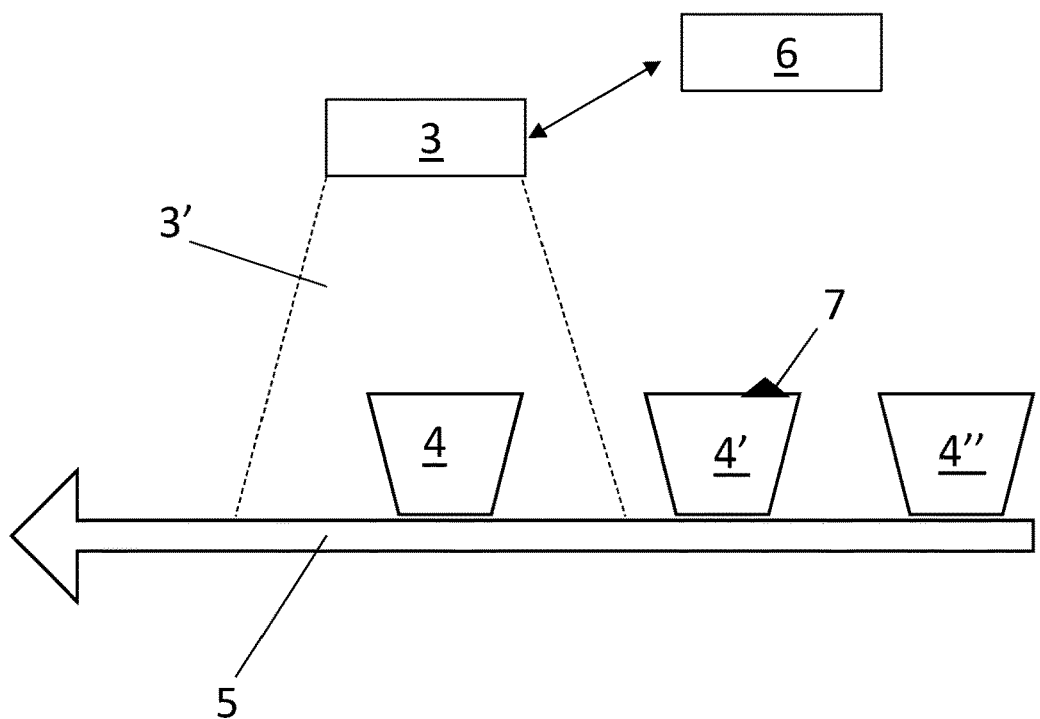

A production line visual inspection process, typically occurring at a manufacturing plant, includes a setup stage (FIG. 6A) and an inspection stage (FIG. 6B). In the setup stage two or more samples of a manufactured item of the same type, (in some embodiment, the samples are items with no defects), e.g., defect-free sample items 2 and 2', are placed in succession within a field of view (FOV) 3' of (one or more) camera 3. For example, defect-free sample items 2 and 2' may be placed on an inspection line which includes conveyor belt 5 such that movement of the conveyor belt 5 first brings item 2 into the FOV 3' and then brings item 2' into the FOV 3'. Images captured by camera 3 may be displayed on a user interface device 6.

Each defect-free sample item 2 and 2' is imaged by camera 3. These images, which may be referred to as setup images or reference images, may be obtained, as described above, by using on each image different imaging parameters of camera 3, for example different focuses and exposure times. The setup images are analyzed to collect information, such as, spatial properties and discriminative features of the type of item being imaged. Spatial properties may include, for example, 2D shapes and 3D characteristics of an item. Discriminative features typically include digital image features (such as used by object recognition algorithms) that are unique to an item and can be used to discriminate between the item and background in the image.

In some embodiments, an amount "n" of images captured at different exposures and the exposure values of the different exposures, which, when combined would provide an optimal image (an HDR image), is determined during the setup stage. Alternatively or in addition, an exposure value (Eopt) that enables optimal detection of an object in the image, can be determined during the setup stage.

Instructions to a user regarding adjustment of camera and/or illumination parameters can be displayed to the user via a user interface 6. Once it is determined, based on the analysis of the reference images, that enough information about the item is obtained, the setup stage may be concluded and a notification is displayed or otherwise presented to a user, via user interface 6, to stop placing samples (sample items 2 and 2') on the conveyor belt 5 and/or to place on the conveyor belt 5 inspected items 4, 4' and 4" (as shown in FIG. 6B).

In the inspection stage (FIG. 6B) that follows the setup stage, inspected items 4, 4' and 4", which are of the same type as sample items 2 and 2' and which may or may not have defects, are imaged in succession by camera 3. These images, which may be referred to as inspection images, are analyzed using computer vision techniques (e.g., machine learning processes) to detect defects in items 4, 4' and 4". In the example illustrated in FIG. 6B, item 4' includes a defect 7, whereas items 4 and 4" are defect-free.

In some embodiments camera 3 may be attached to the inspection line, e.g., the camera may be fixed in relation to the conveyer belt 5 using a mount. Motion of the conveyor belt, for example, or other parts of the inspection line, can translate, via the mount, to movement or vibrations of the camera. The mount and/or camera may be provided with stabilizers for vibration damping however, some movement or vibrations of the camera and/or of the item on the conveyor belt, may occur.

In some cases, analysis of the images at the setup stage is used to determine motion of the camera and/or item on the inspection line, for example, by dense (pixel-by-pixel) registration of consecutive images to check for motion in the whole or parts of the imaged item.

Figure 7A:
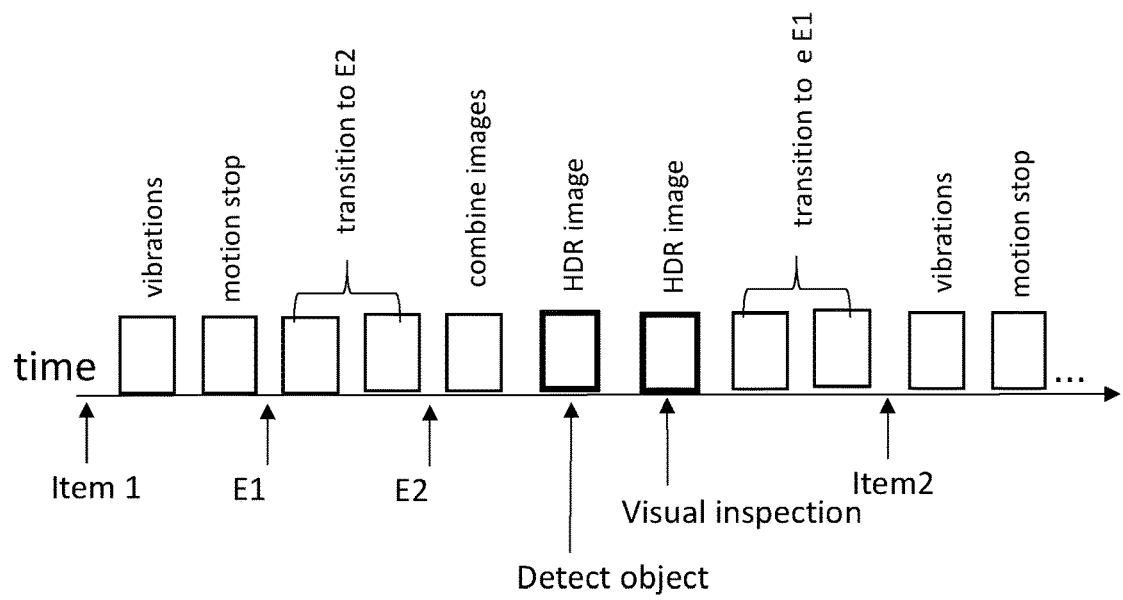
FIG. 7A schematically illustrates a timeline of a visual inspection process using an HDR image.
Figure 7B:
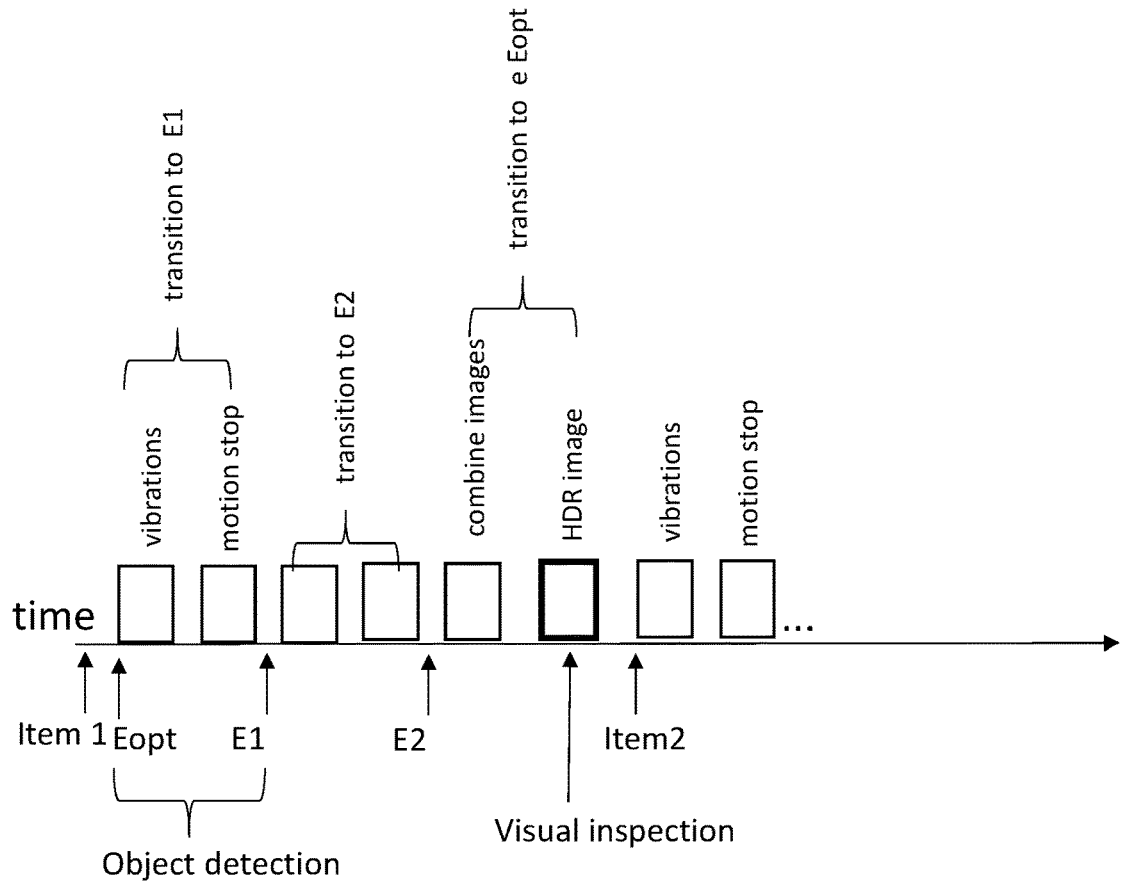
FIG. 7B schematically illustrates a timeline of visual inspection process using an HDR image according to embodiments of the invention.

FIGS. 7A and 7B schematically illustrate time lines of a visual inspection process, such as described in FIG. 6B.

The time line illustrated in FIG. 7A shows a visual inspection process using an HDR image but not using methods according to embodiments of the invention, whereas the timeline illustrated in FIG. 7B shows a visual inspection process using an HDR image according to embodiments of the invention.

In FIG. 7A, an automated visual inspection process is shown, which uses HDR video analysis rather than single exposure analysis. In automated visual inspection processes often between the arrival time of an object to be inspected and actual start of inspection there are several frames to be processed. For example, detection of the object's exact location, waiting for the object to settle in place or identifying a need to adjust some of the camera or the illumination parameters, may all take the time of several frames. Thus, in addition to a longer inspection frame acquisition time in HDR video, the preceding processed frames acquisition time is also much longer, together accumulating to even greater time gap between HDR video processing and single exposure video processing.

For example, as illustrated in FIG. 7A, a first item (item 1) is placed on an inspection line, typically during the inspection stage. Often in production lines, the placing of an item incurs shock which results with vibrations of the item and/or the camera. Some time (e.g., two frames) passes until motion or vibrations of the camera and/or item stop. An image is then captured at exposure level E1. The camera transitions then to exposure level E2. This transition takes some time (e.g., two frames). Once the camera parameters are set for capturing an image at exposure level E2, an image is captured (and so on, for more exposures, if more exposures have been determined to be required for obtaining an HDR image). A processor then combines the two images captured at exposure level E1 and at exposure level E2, providing an HDR image. The processor then runs object detection algorithms on the HDR image and then provides the HDR image for visual inspection (e.g., displays the image and/or runs defect detection algorithms on the image). The camera then takes time (e.g., two frames) to transition back to exposure level E1 to obtain an image of a next object (item 2) and so on.

In the time line illustrated in FIG. 7B, methods according to embodiments of the invention enable a shortened, time-effective, HDR video analysis process.

A first item (item 1) is placed on the inspection line, typically during the inspection stage. Since an optimal exposure level (Eopt) has been pre-determined, an image captured at Eopt can be used to detect the item within the image, while the movements and vibrations of the camera and/or item stop. Additionally, the camera can transition to exposure level E1 while the movements and vibrations of the camera and/or item stop. Thus, the otherwise wasted time gap of, e.g., two frames, is utilized to promote the process, for example by performing alignment of the item in the image to one or more of the setup images. Once the camera parameters are set for capturing an image at exposure level E1, an image of the item is captured at exposure level E1. The camera transitions then to exposure level E2. This transition takes some time (e.g., two frames). Once the camera parameters are set for capturing an image at exposure level E2, an image is captured (and so on, for more exposures, if more exposures have been determined to be required for obtaining an HDR image). The processor then combines the two images captured at exposure level E1 and at exposure level E2, providing an HDR image. Since the object has already been detected, the processor may immediately use the HDR image for visual inspection (e.g., displaying the image and/or running defect detection algorithms on the image). In parallel, the camera transitions back to exposure level E1 to obtain an image of a next object (item 2), thereby eliminating the time gap of two frames shown in FIG. 7A, and so on.

In some embodiments, Eopt is one of the exposures used to capture images for combining into a single HDR image, hence, eliminating the gap created by obtaining one of the set of n images determined to be required for creating the HDR image.

Figure 8:
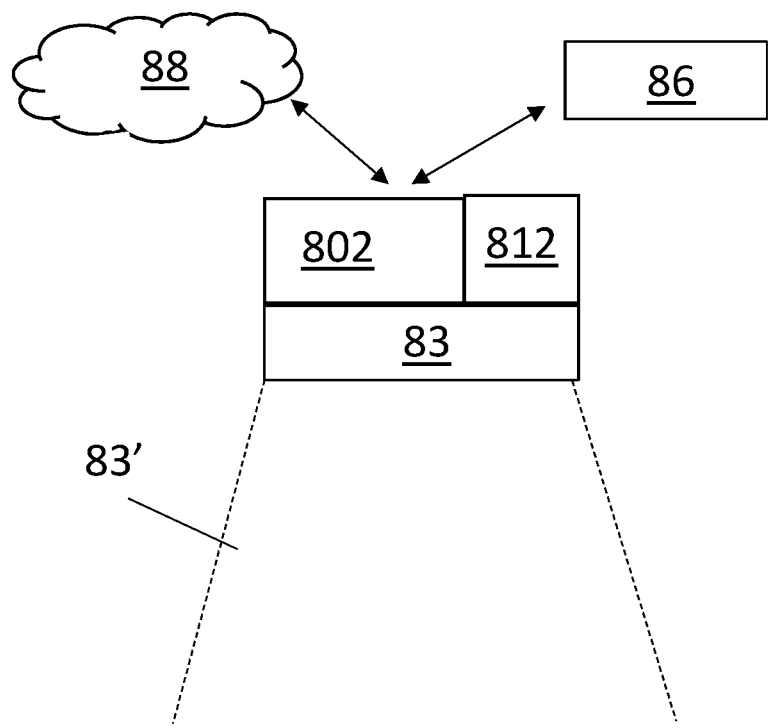
FIG. 8 schematically illustrates a system operable according to embodiments of the invention.

A system for automated visual inspection, which may be operable according to embodiments of the invention, is schematically illustrated in FIG. 8.

An exemplary system which may be used for automated visual inspection of an item on an inspection line, includes a processor 802 in communication with one or more camera (s) 83 and with a device, such as a user interface device 86 and/or other devices, such as storage device 88.

Components of the system may be in wired or wireless communication and may include suitable ports and/or network hubs. In some embodiments processor 802 may communicate with a device, such as storage device 88 and/or user interface device 86 via a controller, such as a programmable logic controller (PLC), typically used in manufacturing processes, e.g., for data handling, storage, processing power, and communication capabilities. A controller may be in communication with processor 802, storage device 88, user interface device 86 and/or other components of the system, via USB, Ethernet, appropriate cabling, etc.

Processor 802 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processor 802 may be locally embedded or remote.

The user interface device 86 may include a display, such as a monitor or screen, for displaying images, instructions and/or notifications to a user (e.g., via text or other content displayed on the monitor). User interface device 86 may also be designed to receive input from a user. For example, user interface device 86 may include a monitor and keyboard and/or mouse and/or touch screen, to enable a user to input feedback.

Storage device 88 may be a server including for example, volatile and/or non-volatile storage media, such as a hard disk drive (HDD) or solid-state drive (SSD). Storage device 88 may be connected locally or remotely, e.g., in the cloud. In some embodiments, storage device 88 may include software to receive and manage image data related to reference images. A reference image database may be located at storage device 88 or at another location.

Camera(s) 83, which are configured to obtain an image of an inspection line, are typically placed and fixed in relation to the inspection line (e.g., a conveyer belt), such that items placed on the inspection line are within the FOV 83' of the camera 83.

Camera 83 may include a CCD or CMOS or other appropriate chip. The camera 83 may be a 2D or 3D camera. In some embodiments, the camera 83 may include a standard camera provided, for example, with mobile devices such as smart-phones or tablets. In other embodiments the camera 83 is a specialized camera, e.g., a camera for obtaining high resolution images.

The system may also include a light source, such as an LED or other appropriate light source, to illuminate the camera FOV 83', e.g., to illuminate an item on the inspection line.

Processor 802 receives image data (which may include data such as pixel values that represent the intensity of reflected light as well as partial or full images or videos) of objects on the inspection line from the one or more camera(s) 83 and runs processes according to embodiments of the invention.

Processor 82 is typically in communication with a memory unit 812. Memory unit 812 may store at least part of the image data received from camera(s) 83.

Memory unit 812 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In some embodiments the memory unit 812 stores executable instructions that, when executed by processor 802, facilitate performance of operations of processor 802, as described herein.

In one embodiment a system for automated visual inspection of an object includes a camera 83 attached to an inspection line (e.g. to a conveyor belt). Processor 802 receives from the camera 802 a predetermined number of images of an object on the inspection line, each image having a different predetermined exposure value. Processor 802 combines the images to provide a combined image and may then cause the combined image to be displayed on the user interface device 86. Processor 802 may run defect detection algorithms on the combined image or apply other algorithms to perform additional inspection tasks on the combined image.

Processor 802 controls the imaging parameters of the camera 83 to transition between the different predetermined exposure levels. In some embodiments the transition is done while combining the images to provide the combined image.

In some embodiments the processor 802 can determine when the camera 83 is motionless, for example, based on image analysis of the images received from the camera 83 (e.g. by applying dense registration of consecutive images). Processor 802 may control the camera 83 to obtain images of the object on the inspection line at the predetermined exposure levels, when the camera is motionless.

Embodiments of the invention provide use of HDR images in video processing without requiring specialized cameras and minimize time gaps in the process, thereby providing an enhanced quality and time effective machine vision image processing, e.g., visual inspection process.

The invention claimed is:

1. A method for machine vision image processing, the method comprising:
    obtaining a plurality of images of a scene from a camera having a dynamic range, each image having a different exposure value;
    detecting pixels associated with an object in each of the plurality of images of the scene;
    comparing pixel values of pixels associated with the object to identify a portion of each image having pixel values which are closest to a middle of the dynamic range of the camera to obtain a minimal number of optimal images;
    combining the minimal number of optimal images to obtain an HDR image of the scene;
    determining an exposure level Eopt which enables a highest level of information of the object;
    capturing an image of the object at Eopt; and
    detecting the object in the image captured at Eopt;
    wherein the minimal number of optimal images combined to obtain the HDR image includes the image captured at Eopt.

2. The method of claim 1, wherein an optimal image is determined based on a difference between values of pixels of the image to a middle value of the dynamic range.

3. The method of claim 1, further comprising:
    receiving indications of borders of the object from a user; and
    determining which pixels are associated with the object based on the borders of the object.

4. The method of claim 1, wherein the object is an area of interest within the scene.

5. The method of claim 1, wherein the object is an item on a visual inspection line or an area of interest on the item.

6. The method of claim 1, further comprising:
    using the HDR image of the scene in an iterative process of analysis of the scene.

7. The method of claim 6, wherein the process of analysis comprises detecting a defect on an object on a visual inspection line.

8. The method of claim 1, wherein the identified pixel values of the optimal images are closest to a midpoint of the dynamic range of the camera.

\* \* \* \* \*